(12) United States Patent
Izumi et al.

(10) Patent No.: US 7,105,768 B2
(45) Date of Patent: Sep. 12, 2006

(54) FIXED TYPE ELECTRODE TIP TAKE-OUT DEVICE

(75) Inventors: Takehiro Izumi, Ayase (JP); Takashi Kanno, Ayase (JP); Kenji Hayafuji, Ayase (JP)

(73) Assignee: Obara Corporation, Ayase (JP)

( * ) Notice: Subject to any disclaimer, the term of this patent is extended or adjusted under 35 U.S.C. 154(b) by 0 days.

(21) Appl. No.: 10/895,538

(22) Filed: Jul. 21, 2004

(65) Prior Publication Data
US 2005/0023250 A1    Feb. 3, 2005

(30) Foreign Application Priority Data
Jul. 30, 2003    (JP)    ............................ 2003-282427

(51) Int. Cl.
  *B23K 11/30*    (2006.01)
(52) U.S. Cl. .................................. 219/86.8; 219/86.25
(58) Field of Classification Search .................. 219/84, 219/86.25, 86.8, 119; 29/426.4
See application file for complete search history.

(56) References Cited
U.S. PATENT DOCUMENTS
4,794,221 A * 12/1988 Takabe et al. ............. 219/86.8
5,495,663 A *  3/1996 Saito ............................. 29/762
5,734,141 A *  3/1998 Voilmy et al. ............ 219/86.25
6,188,038 B1 *  2/2001 Kazuhiro ................... 219/86.8
6,667,454 B1 * 12/2003 Rigaux ....................... 219/86.8

FOREIGN PATENT DOCUMENTS
JP              4-89182      *  3/1992
JP              05-28575         4/1993

* cited by examiner

*Primary Examiner*—Kevin Kerns
*Assistant Examiner*—Michael Aboagye
(74) *Attorney, Agent, or Firm*—Flynn, Thiel, Boutell & Tanis, P.C.

(57) ABSTRACT

There is provided a fixed type electrode tip take-out device capable of solving the problem of irregularities of positions of upper and lower electrode tips by urging a tip magazine to be movable, and fixing the locations of the electrode tips of each group at the portions to be fixed to a welder, thereby taking out the electrode tips from the tip magazine with accuracy. The tip magazine is urged to be movable relative to a base plate by a driving unit, boundary portions of respective through holes are partitioned by elastic boundary walls in which wedges are inserted in the same direction as an axis of each through hole, and lowest end portions of electrode tips of each group housed in the tip magazine are brought into contact with a slide plate fixed to the base plate, and the upper and lower electrode tips of each group located at portions to be fixed to a welder are positioned by stoppers fixed to the base plate.

4 Claims, 4 Drawing Sheets

FIXED TYPE ELECTRODE TIP TAKE-OUT DEVICE

FIELD OF THE INVENTION

The invention relates to a device for taking out welding electrode tips engaged in shanks in tapered shape (hereinafter referred to as taper-engaged) from a tip magazine.

BACKGROUND OF THE INVENTION

There is a fixed type electrode tip take-out device for taking out welding electrode tips taper-engaged in shanks from a tip magazine, which is, for example, disclosed in Japanese Utility Model Laid Open Publication No. 5-28575, wherein a plurality of semi-cylindrical through holes are opened at one end and positioned adjacent to each other around the tip magazine, and two electrode tips are grouped and housed up and down oppositely in each through hole. This prior art has the problem in that the electrode tips of each group which are housed in the tip magazine are held down by adding an elastic body which is separately provided so that extra components are needed and positions of the upper and lower electrode tips of each group becomes irregular. Further, this prior art does not disclose moving means of the tip magazine and stoppers, and hence there occurs a problem that it is indefinite as to whether positional control of the electrode tips of each group located at portions to be fixed to a welder is reliably effected.

SUMMARY OF THE INVENTION

The invention has been made in view of the problems of the prior art as set forth above, and has as an object to provide a fixed type electrode tip take-out device in which boundary walls of respective through holes are formed of elastic walls, and each lowest end portion of the electrode tip of each group is brought into contact with a slide plate so as to urge a tip magazine to be removable, and the problem of irregularities of the upper and lower electrode tips of each group is resolved using stoppers, and further, the positions of the electrode tips of each group located at portions to be fixed to a welder are secured so as to take out the electrode tips from the tip magazine with accuracy.

To achieve the above object, the fixed type electrode tip take-out device according to the first aspect of the invention comprises a plurality of semi-cylindrical through holes opened at one end and positioned adjacent to each other around the tip magazine, characterized in that two electrode tips are grouped and housed opposite to each other in each through hole; wherein the tip magazine is urged to be movable relative to a base plate owing to a driving force from a driving unit, boundary portions of respective through holes are partitioned by elastic boundary walls in which wedges are inserted in the same direction as an axis of each through hole, lowest end portions of electrode tips of each group housed in the tip magazine are brought into contact with a slide plate fixed to the base plate, the upper and lower electrode tips of each group located at portions to be fixed to a welder are positioned by stoppers fixed to the base plate, thereby forming passages of the stoppers on the elastic boundary walls.

The invention according to the second aspect of the invention is characterized in that the tip magazine is discoid and the plurality of semi-cylindrical through holes are opened at one end and formed around the tip magazine.

The invention according to the third aspect of the invention is characterized in that the tip magazine has a substantially rectangular box-shape as viewed from the top, and the plurality of semi-cylindrical through holes are opened at one end and formed to extend from the upper surface to the lower surface of the tip magazine.

The invention according to the fourth aspect of the invention is characterized in that the driving unit is partitioned into a cylinder front chamber and a cylinder rear chamber by a piston, wherein pressurized fluid is supplied to or discharged from the cylinder front chamber, and an elastic body is disposed in the cylinder rear chamber.

PREFERRED EMBODIMENT OF THE INVENTION

A fixed type electrode tip take-out device comprises a plurality of semi-cylindrical through holes which are opened at one end and positioned adjacent to each other around a tip magazine, two electrode tips are grouped or paired and housed opposite to each other in the through holes, wherein the tip magazine is urged to be movable relative to the base plate by a driving force from a driving unit, boundary portions of respective through holes are partitioned by elastic boundary walls in which wedges are inserted in the same direction as axes of the through holes, lowest end portions of the electrode tips of each group housed in the tip magazine are brought into contact with the slide plate fixed to the base plate, and upper and lower electrode tips of each group located at portions to be fixed to the welder are positioned by stoppers fixed to the base plate, thereby forming passages of the stoppers on the elastic boundary walls.

The upper and lower shanks provided on the welder are positioned relative to the upper and lower electrode tips of each group, which are positioned by the stoppers of the upper and lower electrode tips, which are housed in the tip magazine, by moving the welder by the robot, thereby fixing the electrode tips sequentially on each shank.

When the electrode tips which are positioned by the stoppers are taken out, the tip magazine which is urged to be movable relative to the base plate is moved, so that next upper and lower electrode tips of each group are positioned by the stoppers, thereby rendering the electrode tips of this group to standby so as to fix the electrode tips of this group to the upper and lower shanks of the next welder.

FIRST EXAMPLE

Figure 1:
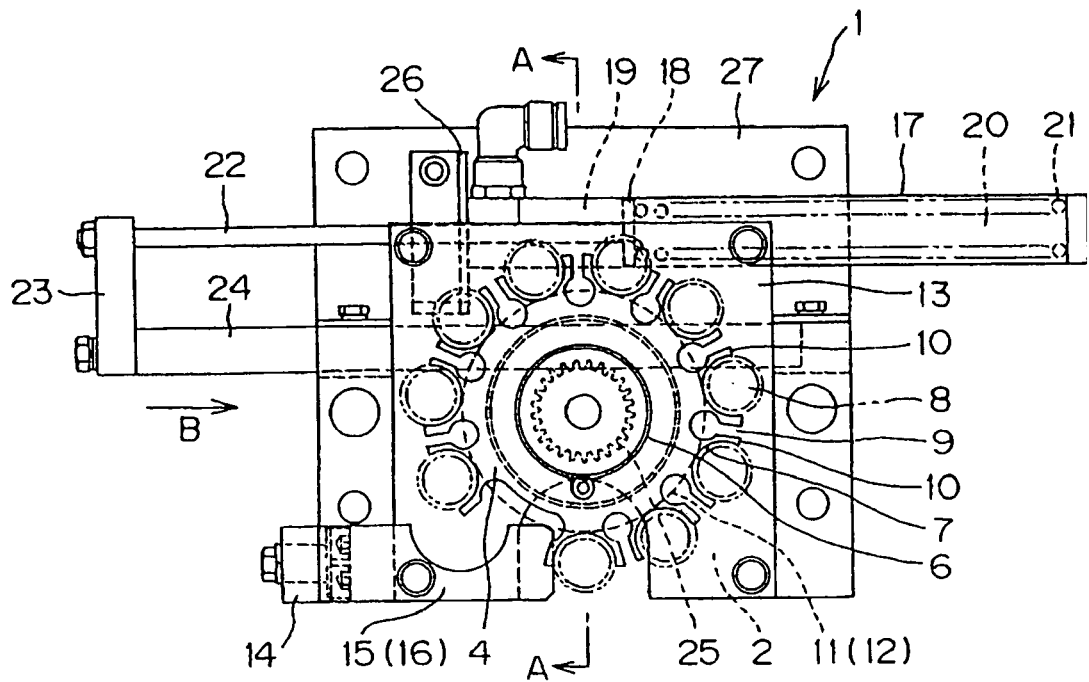
FIG. 1 is a plan view of a main portion of a fixed type electrode tip take-out device according to a first embodiment of the invention.
Figure 2:
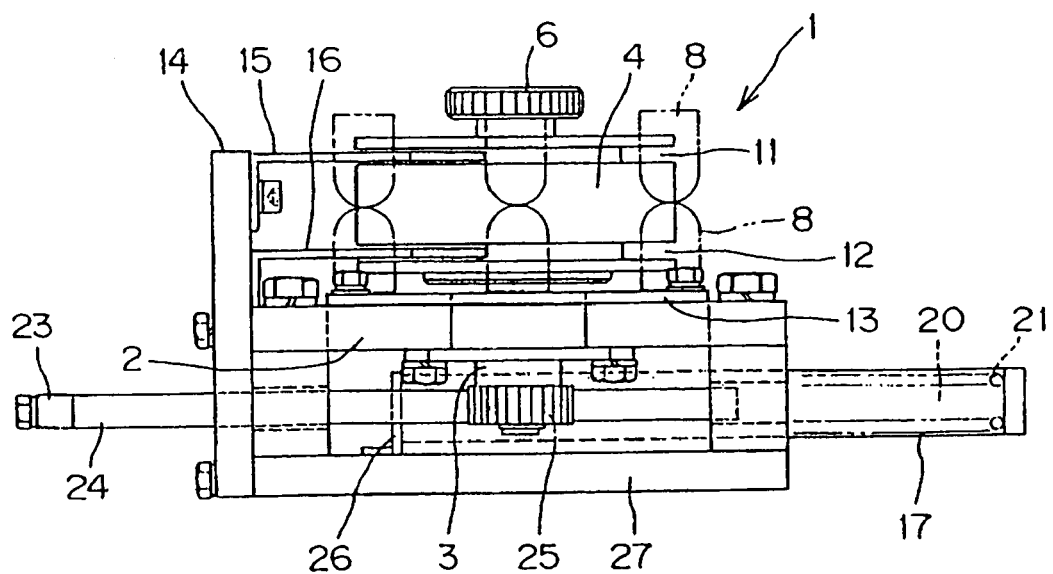
FIG. 2 is a front view of the fixed type electrode tip take-out device shown in FIG. 1.
Figure 3:
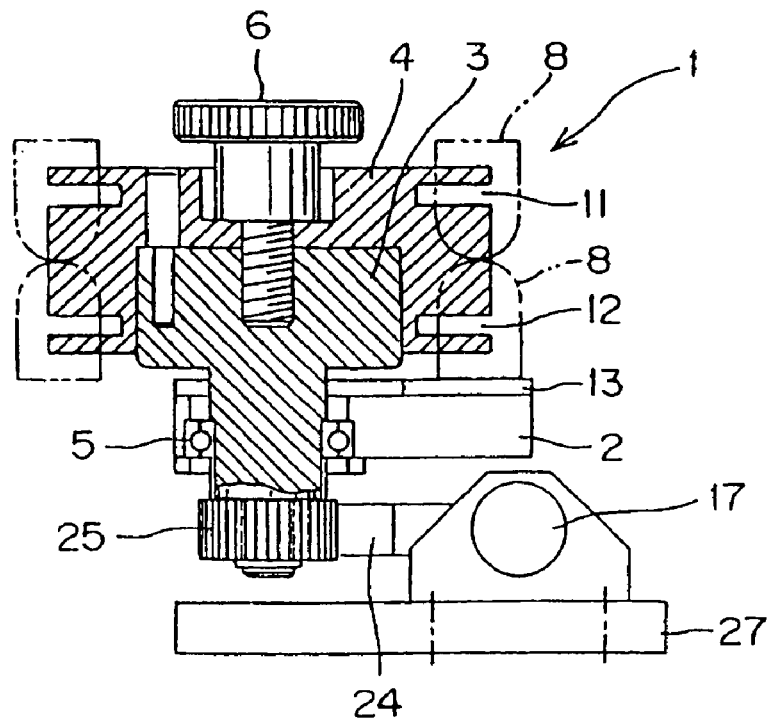
FIG. 3 is a sectional view taken along the line A—A shown in FIG. 1.
Figure 4:
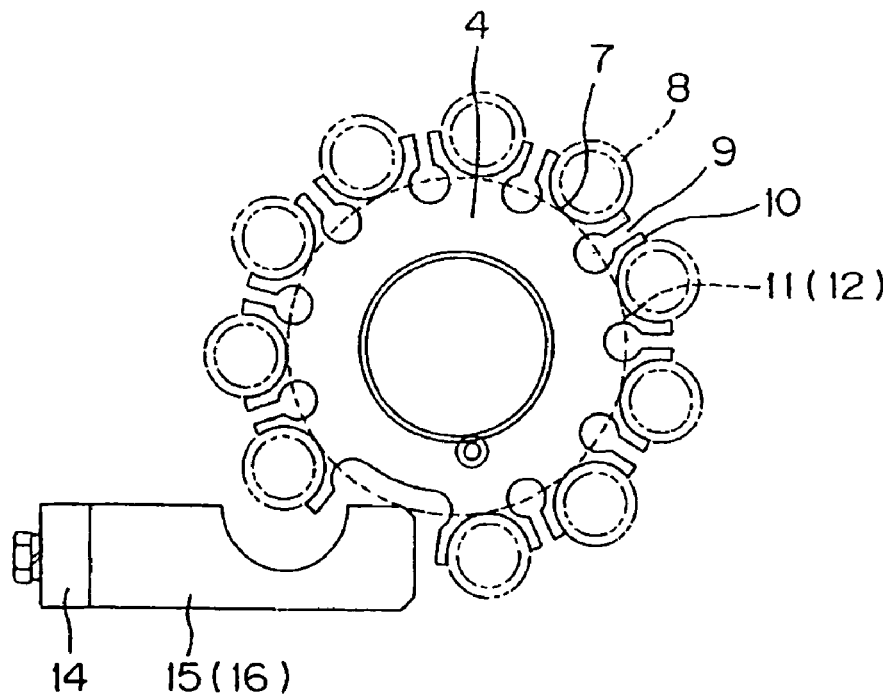
FIG. 4 is a view for explaining a tip magazine set position.

FIGS. 1 to 4 relate to the fixed type electrode tip take-out device according to the first embodiment of the invention, wherein FIG. 1 is a plan view showing the main portion thereof, FIG. 2 is a front view thereof, FIG. 3 is a sectional view taken along the line A—A shown in FIG. 1, and FIG. 4 is a view for explaining a magazine set position.

In FIGS. 1 to 4, depicted by 1 is an entire view of the fixed type electrode tip take-out device, wherein a tip magazine 4 is rotatably fixed to a base plate 2 of the fixed type electrode tip take-out device 1 via a rotary shaft 3. Depicted by 5 is a bearing provided between the rotary shaft 3 and the base plate 2, and 6 is a knob provided with a screw part for fixing the tip magazine 4 to the rotary shaft 3 or removing the tip magazine 4 from the rotary shaft 3.

The tip magazine 4 is substantially discoid and a plurality (e.g. 10) of semi-cylindrical through holes 7,7 . . . are opened at one end and positioned adjacent to each other around the tip magazine 4, and two electrode tips 8,8 are grouped or paired and housed in each through hole 7 while opposed to each other up and down as shown in the imaginary lines. The boundary portions of respective through holes 7,7 are partitioned by elastic boundary walls 10,10 in which wedges 9 are inserted in the same direction as the axis of each through hole 7. Passages 11, 12 of stoppers, described later, are formed on the upper and lower portions of the elastic boundary walls 10,10.

A side plate 13 is fixed to the base plate 2 and the lowest end portions of the electrode tips 8,8 of each group which are housed in the tip magazine 4 are brought into contact with and supported by the slide plate 13.

Upper and lower stoppers 15,16 are fixed to the base plate 2 via a strut 14, and the upper and lower electrode tips 8,8 of each group located at portions to be fixed to a welder (not shown) are positioned by the stoppers 15,16.

Depicted by 17 is a driving unit serving as a generation source of a driving force for rotatably urging the tip magazine 4 toward the base plate 2, and the driving unit 17 is partitioned by a piston 18 into a cylinder front chamber 19 and a cylinder rear chamber 20, wherein a pressurized fluid such as air or water is supplied to or discharged from the cylinder front chamber 19 and an elastic body 21 such as a spring is disposed in the cylinder rear chamber 20.

A rod 22 from the driving unit 17 is connected to a rack 24 via a connection member 23 and a rack 24 directs and extends to the lower direction of the tip magazine 4. A rack gear 25 meshing with the rack 24 is fixed to the lower end of the rotary shaft 3 to which the tip magazine 4 is fixed.

Depicted by 26 is a bracket for holding the driving unit 17 and the bracket 26 is fixed to a floor table 27 from which a plurality of legs (not shown) extend downward so as to install the electrode tip take-out device 1 at a predetermined position.

With the configuration set forth above, the knob 6 is rotated in a state where the driving unit 17 is not operated (a state where the pressurized fluid is not in the cylinder front chamber 19) to separate the tip magazine 4 from the rotary shaft 3, whereby two electrode tips 8,8 are grouped or paired and housed opposite to each other in the through holes 7,7 of the tip magazine 4 outside the electrode tip take-out device 1, thereby rendering the electrode tips 8,8 of each group in a state to be held by the elastic boundary walls 10,10 50 that the tip magazine 4 is connected to the rotary shaft 3 using the knob 6 in a positional relation between the stoppers 15,16 as shown in FIG. 4.

When the driving force is generated (the pressurized fluid is supplied to the cylinder front chamber 19) in a state where the tip magazine 4 is connected to the rotary shaft 3 while two electrode tips 8,3 are grouped and housed oppositely in the through holes 7,7 of the tip magazine 4, the rod 22 is drawn toward the driving unit 17 by this driving force, so that the rack 24 is moved in the direction of the arrow B and the rack gear 25 meshing with the rack 24 is slightly rotated. Accordingly, the tip magazine 4 is slightly rotated through the slight rotation of the rack gear 25 so that the upper and lower electrode tips 8,8 of each group located at portions to be fixed to the welder are brought into contact with the stoppers 15,16 and positioned by the stoppers 15,16, thereby rendering the electrode tip take-out device 1 in the state shown in FIG. 1. At this time, the tip magazine 4 is urged in a rotating direction relative to the base plate 2 by the driving force from the driving unit 17. The lowest end portions of the electrode tips 8,8 of each group which are housed in the tip magazine 4 are aligned with each other uniformly by the slide plate 13.

In this state, the upper and lower shanks provided on the welder are positioned over and under the upper and lower electrode tips 8, 8 of each group which are positioned by the stoppers 15, 16 of the upper and lower electrode tips 8, 8 and housed in the tip magazine 4 by moving the welder by the robot. Subsequently, the lower shank is moved upward to engage in the lower electrode tip 8, then the upper shank is moved downward to engage in the upper electrode tip 8, thereby reliably engaging the upper and lower electrode tips 8, 8 with each other. At the time when the upper and lower electrode tips 8, 8 are reliably engaged with each other, both upper and lower shanks are moved away from the upper and lower electrode tips 8, 8 so that new electrode tips 8, 8 are fixed to the welder.

In such a manner, when the upper and lower electrode tips 8, 8 which have been positioned by the stoppers 15, 16 are fixed to the welder and taken out from the tip magazine 4, the stopping of rotation of the tip magazine 4 by the stoppers 15, 16 is released so that the tip magazine 4 is rotated by the urging force caused by the driving force from the driving unit 17, and the next upper and lower electrode tips 8, 8 housed in the tip magazine 4 are brought into contact with the stoppers 15, 16 so as to position the upper and lower electrode tips 8, 8 of each group to be taken out next.

When the tip magazine 4 is returned to an initial state, the pressurized fluid in the cylinder front chamber 19 is discharged to return the piston 18 to the original position by the force of the elastic body or spring 21. In the case where the electrode tip 8 is fixed only to the upper shank, the fixing operation of the electrode tip 8 relative to the lower shank is omitted and only the fixing operation of the electrode tip 8 relative to the upper shank may be effected.

SECOND EMBODIMENT

Figure 5:
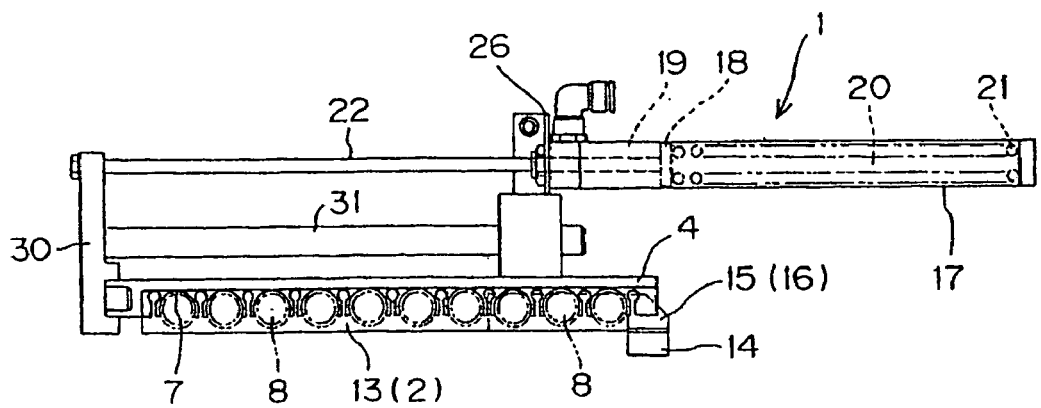
FIG. 5 is a plan view of a main portion of a fixed type electrode tip take-out device according to a second embodiment of the invention.
Figure 6:
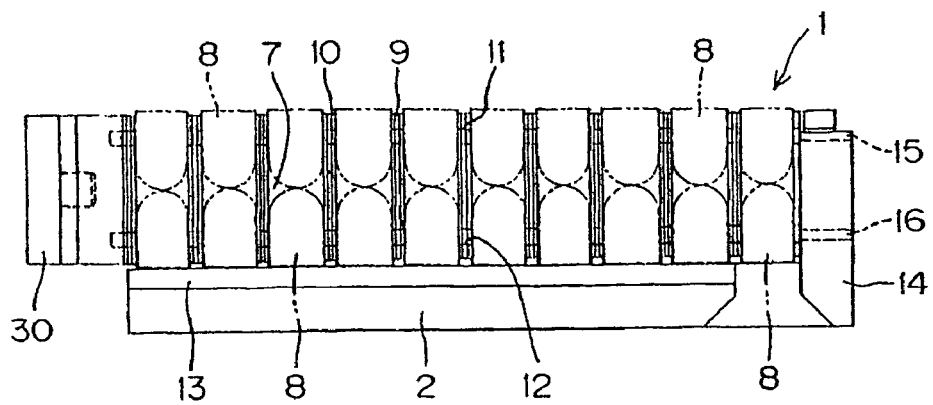
FIG. 6 is an enlarged front view of the fixed type electrode tip take-out device shown in FIG. 5.
Figure 7:
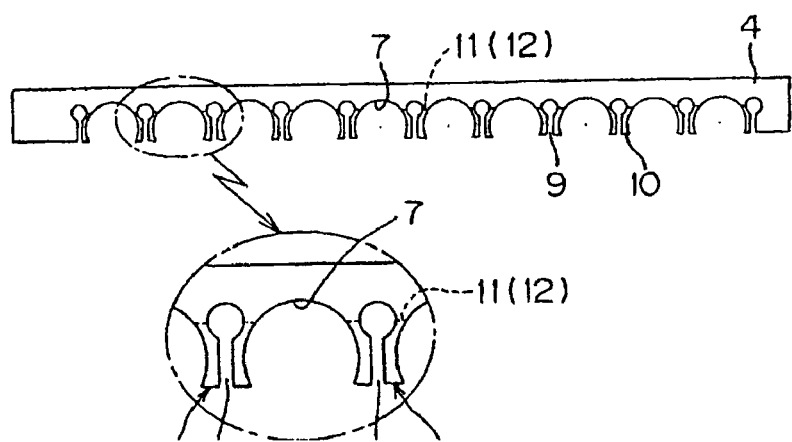
FIG. 7 is a plan view of a main portion of a tip magazine including a partially enlarged view thereof.
Figure 8:
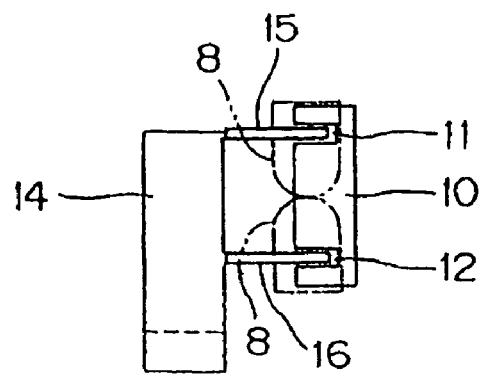
FIG. 8 is a side view of the fixed type electrode tip take-out device shown in FIG. 6.
Figure 9:
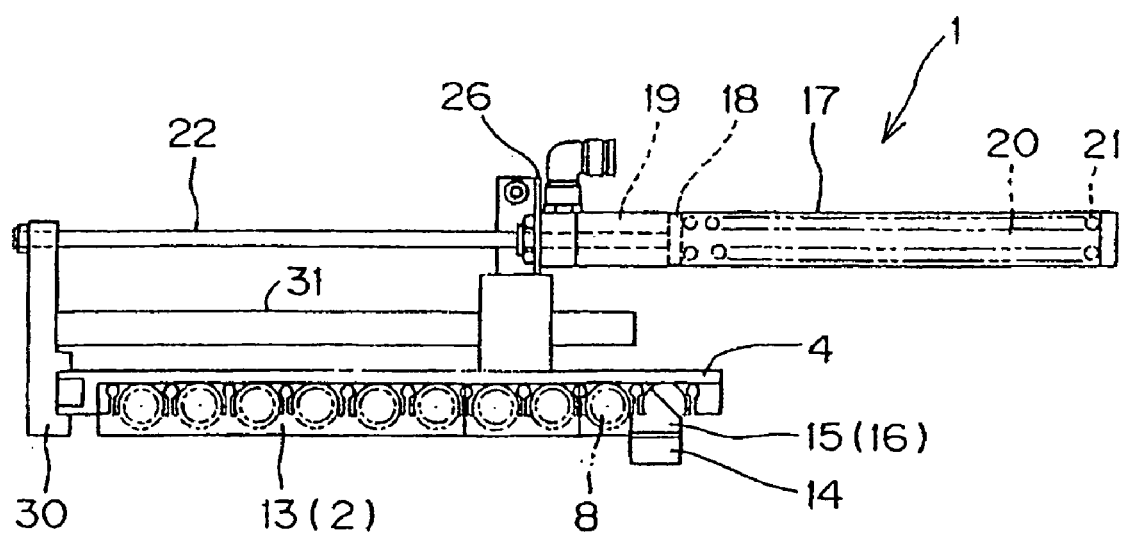
FIG. 9 is a view for explaining the operation of the fixed type electrode tip take-out device shown in FIG. 5

FIGS. 5 to 9 relate to a fixed type electrode tip take-out device according to the second embodiment of the invention, wherein FIG. 5 is a plan view of the main portion of the fixed type electrode tip take-out device, FIG. 6 is a front view thereof, FIG. 7 is a plan view of a tip magazine, FIG. 8 is a side view of the fixed type electrode tip take-out device shown in FIG. 6, and FIG. 9 is a view for explaining an operation of the fixed type electrode tip take-out device shown in FIG. 5.

According to the second embodiment, the tip magazine has a substantially rectangular boxed-shape as viewed from the top thereof, and a plurality of semi-cylindrical through holes which are opened at one end and formed to extend from the upper surface to the lower surface of the tip magazine. An urging force of a driving unit relative to the tip magazine operates linearly, which is different from the first embodiment, and other components of the electrode tip take-out device 1 are substantially the same as those of the first embodiment, and hence the same components are depicted by the same reference numerals and the explanation thereof is omitted.

That is, the tip magazine 4 has a substantially rectangular boxed-shape as viewed from the top thereof, as shown in FIG. 7, and a plurality of semi-cylindrical through holes 7, 7 . . . which are opened at one end are formed to extend from the upper surface to the lower surface of the tip magazine, and two electrode tips 8, 8 are grouped and housed oppositely up and down in each through hole. The boundary portions of the respective through holes 7,7 are partitioned by elastic boundary walls 10, 10 in which the wedges 9, 9 are inserted in the same direction as axes of the through holes 7, 7. Passages 11, 12 of stoppers 15, 16 are formed on the upper and lower portions of the elastic boundary walls 10,10.

A push member 30 is connected to a rod 22 from a driving unit 17 and the tip magazine 4 can be moved in parallel with the rod 22 by the push member 30. Depicted by 31 is a guide rod for securing the movement of the tip magazine 4.

A slide plate 13 is fixed to a base plate 2, and the tip magazine 4 moves on the slide plate 13. The stoppers 15, 16 are fixed up and down to the tip end of the base plate 2 via a strut 14 and the upper and lower electrode tips 8, 8 of each group located at portions to be fixed to a welder (not shown) are to be positioned by the stoppers 15, 16.

Accordingly, the upper and lower shanks provided on the welder are positioned over and under the upper and lower electrode tips 8, 8 of each group which are positioned by the stoppers 15, 16 of the upper and lower electrode tips 8, 8 which are housed in the tip magazine 4 by moving the welder by the robot. Subsequently, the lower shank is moved upward to engage in the lower electrode tip 8, then the upper shank is moved downward to engage in the upper electrode tip 8, thereby reliably engaging the upper and lower electrode tips 8, 8 with each other. At the time when the upper and lower electrode tips 8, 8 are reliably engaged with each other, both the upper and lower shanks are moved away from the upper and lower electrode tips 8, 8 so that new electrode tips 8, 8 are fixed to the welder.

When the upper and lower electrode tips 8, 8 which have been positioned by the stoppers 15, 16 are fixed to the welder and taken out from the tip magazine 4, the stopping of rotation of the tip magazine 4 by the stoppers 15, 16 is released so that the tip magazine 4 is moved by the urging force caused by the driving force from the driving unit 17 and next upper and lower electrode tips 8, 8 housed in the tip magazine 4 are brought into contact with the stoppers 15, 16 so as to position the upper and lower electrode tips 8, 8 of each group to be taken out next (See FIG. 9).

When the tip magazine 4 is returned to an initial state, the pressurized fluid is discharged from a cylinder front chamber 19 like the first embodiment so as to return a piston 18 to an original position by the force of a spring 21.

According to the invention, since the boundary portions of the respective through holes are partitioned by elastic boundary walls in which wedges are inserted in the same direction as axes of the through holes, and the lowest end portions of the electrode tips of each group which are housed in the tip magazine are brought into contact with the slide plate fixed to the base plate, the problem of irregularities of the positions of the upper and lower electrode tips of each group is resolved by the slide plate while the electrode tips of each groups are held by the elastic boundary walls without using a separately provided elastic body Further, the tip magazine is urged to be movable relative to the base plate by the driving force from the driving unit, and the upper and lower electrode tips of each group located at portions to be fixed to the welder are positioned by the stoppers fixed to the base plate and the passages of the stoppers are formed on the elastic boundary walls so that the positions of the electrode tips of each group located at portions to be fixed to the welder are secured, thereby forming the fixed type electrode tip take-out device capable of taking out the electrode tips from the tip magazine with accuracy.

Still further, in the case where the tip magazine is discoid and the plurality of semi-cylindrical through holes which are opened at one end are formed around the tip magazine, or in the case where the tip magazine has a substantially rectangular box-shape as viewed from the top, and the plurality of semi-cylindrical through holes which are opened at one end are formed to extend from the upper surface to the lower surface of the tip magazine, either of type of the electrode tip take-out device can be employed by adapting it to the condition of an installing area of either type.

Still further, in the case where the driving unit is partitioned into a cylinder front chamber and the cylinder rear chamber by the piston, wherein pressurized fluid is supplied to or discharged from the cylinder front chamber, and then elastic body is disposed in the cylinder rear chamber, it is possible that the urging force relative to the tip magazine and the returning of the tip magazine to the initial state can be effected with much ease.

What is claimed is:

1. A fixed electrode tip take-out device for taking out welding electrode tips from a tip magazine to be engaged with shanks of a welder, the fixed electrode tip take-out device comprising a tip magazine having a plurality of semi-cylindrical through holes provided therein, the through holes being provided adjacent to one another, boundary portions of respective through holes being partitioned by elastic boundary walls in which wedges are inserted in the same direction as the axis of each through hole and each through hole being open at one end, a pair of electrode tips provided vertically opposite to each other in at least one of the through holes, a base plate, a slide plate fixed to the base plate and in contact with the lowest end portion of the lower electrode tip of the pair of electrode tips, a driving unit for effecting relative movement between the tip magazine and the base plate and stoppers fixed to their base plate for positioning the pair of electrode tips to be removed from the tip magazine and affixed to the shanks of the welder.

2. A fixed type electrode tip take-out device according to claim 1, wherein the tip magazine is discoid and the plurality of semi-cylindrical through holes are opened at one end and formed around the tip magazine.

3. A fixed type electrode tip take-out device according to claim 1, wherein the tip magazine has a substantially rectangular box-shape as viewed from the top, and the plurality of semi-cylindrical through holes are opened at one end and formed to extend from the upper surface to the lower surface of the tip magazine.

4. A fixed type electrode tip take-out device according to claim 1, wherein the driving unit is partitioned into a cylinder front chamber and a cylinder rear chamber by a piston, wherein pressurized fluid is supplied to or discharged from the cylinder front chamber, and an elastic body is disposed in the cylinder rear chamber.

* * * * *